US007283258B1

(12) United States Patent
Kuno et al.

(10) Patent No.: US 7,283,258 B1
(45) Date of Patent: Oct. 16, 2007

(54) PRINT SYSTEM CAPABLE OF NOTIFYING USER OF REQUIRED INK AMOUNT

(75) Inventors: Masashi Kuno, Nagoya (JP); Hiroyuki Sasaki, Nagoya (JP)

(73) Assignee: Brother Kogyo Kabushiki Kaisha, Nagoyo (JP)

( * ) Notice: Subject to any disclaimer, the term of this patent is extended or adjusted under 35 U.S.C. 154(b) by 0 days.

(21) Appl. No.: 09/384,532

(22) Filed: Aug. 27, 1999

(30) Foreign Application Priority Data

Aug. 28, 1998 (JP) ................................ 10-243721
Aug. 31, 1998 (JP) ................................ 10-245628

(51) Int. Cl.
*G06F 3/12* (2006.01)
*G06K 1/00* (2006.01)

(52) U.S. Cl. .................................... 358/1.13; 358/1.15

(58) Field of Classification Search ............... 358/1.13, 358/1.15, 1.14, 1.16, 1.17, 1.18; 399/24–27; 710/7–10, 46–47; 709/223–232
See application file for complete search history.

(56) References Cited

U.S. PATENT DOCUMENTS 5,802,420 A * 9/1998 Garr et al. .................... 399/27
5,937,225 A * 8/1999 Samuels ...................... 399/27
5,970,275 A * 10/1999 Brown, Jr. et al. ........... 399/27
6,348,971 B2 * 2/2002 Owa et al. ................ 358/1.15
6,476,926 B1 * 11/2002 Yano et al. ............... 358/1.14

FOREIGN PATENT DOCUMENTS

| | | |
|---|---|---|
| JP | 6-208442 | 7/1994 |
| JP | 8-16143 | 1/1996 |
| JP | 9-134261 | 5/1997 |
| JP | 10-162022 | 6/1998 |
| JP | 10-171346 | 6/1998 |

* cited by examiner

*Primary Examiner*—Douglas Q. Tran
(74) *Attorney, Agent, or Firm*—Day Pitney

(57) ABSTRACT

When a user inputs a print command, a RIP 20 sets a print start flag OFF so that the printing will not be executed. Then, the RIP 20 receives remaining ink amount data from a printer. Further, the RIP predicts the required amount of ink required by the printer to print a desired image based on preview data. The remaining ink amount and the required ink amount for each different colored ink are displayed on a screen. When insufficient ink remains, then a message indicating this is displayed.

22 Claims, 13 Drawing Sheets

PRINT SYSTEM CAPABLE OF NOTIFYING USER OF REQUIRED INK AMOUNT

BACKGROUND OF THE INVENTION

1. Field of the Invention

The present invention relates to a print system capable of notifying a user of an ink amount required by a printer to perform print operations.

2. Description of the Related Art

There has been known a conventional print system including an information processing terminal for generating original data, a printer controller for converting the original data into print data, and a printer for executing print operations based on the print data.

Specifically, the information processing terminal generates original data. The original data may be data in a page description language (PDL), such as PostScript, or image data, such as Tagged Image File Format (TIFF) image data, Joint Photographic coding Experts Group (JPEG) image data. Because the original data cannot be processed by the printer, the printer controller, such as a raster image processor (RIP), converts the original data into print data which can be processed by the printer. The print data is then transmitted to the printer, and the printer performs print operations based on the print data for forming images on a recording medium.

In a small print system, the printer controller is provided internally in the information processing terminal. However, in large scale print systems, such as a computer network with a larger printer capable of printing banners several meters long, the printer controller is provided as a separate device from the information processing terminal in order to lighten the processing burden on the information processing terminal. In this case, the printer controller is connected between the information processing terminal and the printer.

However, in the print systems described above, sometimes the printer can run out of ink during the middle of print operations. Some printers continue the print operations even though no ink is left. In this case, the image will have undesirable blank spaces where the ink should have been impinged, so that, the print operations must be started all over again.

There has been known a printer that stops printing when ink has run out, and informs the user of the ink run out. After the user has replenished the ink to the printer, the print operations can be restarted from the position where the print operations were stopped. However, while the printing is temporarily stopped, the recording medium may shift in position. As a result, the image can be blur, and the printed image may have an undesirably noticeable blank boundary before and after where printing was temporarily stopped.

In this case also, printing operations need to be started over again. This can be an expensive problem in terms of recording medium and ink cost, especially when a large image is formed on a large recording medium, such as a A0 sized or larger banner.

SUMMARY OF THE INVENTION

It is an objective of the present invention to over come the above-described problems and provide a print system and a method that enables the user to grasp, before the printing starts, whether or not the printer will run out of ink in the middle of print operations.

In order to achieve the above and other objectives, there is provided a print system including a terminal that generates image data, at least one printer that performs print operations for forming an image on a recording medium using an ink based on print data, and a printer controller that is connected between the terminal and the printer and converts the image data into the print data. The printer controller includes predicting means for predicting a required ink amount indicating an amount of ink required for the printer to perform the print operations based on the print data, a memory that stores required ink amount data indicating the required ink amount, and transmitting means for transmitting a request signal to the printer. The request signal requests the printer to transmit remaining ink amount data indicating a remaining ink amount which indicates an amount of ink remaining in the printer. The printer includes managing means for managing the remaining ink amount data, and transmitting means for transmitting the ink amount data in response to the request signal. At least one of the terminal and the printer controller includes receiving means for receiving the remaining ink amount data from the transmitting means of the printer, retrieving means for retrieving the required ink amount data stored in the memory, determination means for determining based on the remaining ink amount data and the required ink amount data, whether or not the remaining ink amount is sufficient to perform the print operations, before the print operations are started, and notifying means for notifying a user of a determination result determined by the determination means.

There is also provided a printer controller connected between a terminal and a printer. The terminal generates image data. The printer performs print operations for forming an image on a recording medium based on print data. The printer transmits remaining ink amount data indicating an amount of ink remaining in the printer in response to a request signal from external devices. The printer controller includes converting means for converting the image data into the print data, predicting means for predicting, based on the image data, a required ink amount indicating an ink amount required by the printer for performing the print operations based on the print data, transmitting means for transmitting the request signal to the printer, receiving means for receiving the remaining ink amount data from the printer, determination means for determining, before the print operations start, whether the remaining ink amount is sufficient for the printer to perform the print operations, and notifying means for notifying a user of determination results determined by the determination means.

Further, there is also provided a printer controller connected between a terminal and a printer. The terminal generates image data. The printer performs print operations for forming an image on a recording medium based on print data. The printer transmits remaining ink amount data indicating an amount of ink remaining in the printer in response to a request signal from external devices. The printer controller includes converting means for converting the image data into the print data, predicting means for predicting, based on the image data, a required ink amount indicating an ink amount required by the printer for performing the print operations based on the print data, first transmitting means for transmitting the request signal to the printer, receiving means for receiving the remaining ink amount data from the printer, determination means for determining, before the print operations start, whether the remaining ink amount is sufficient for the printer to perform the print operations, and second transmitting means for transmitting required ink amount data indicating the required ink amount and the remaining ink amount data to the terminal.

Still further, there is provided a predicting method for predicting a required ink amount required by a printer for performing print operations. The predicting method includes the steps of generating preview data based on image data, displaying a preview image based on the preview data, determining an average tone of pixels of the preview image, based on the average tone, calculating an average density of a print image to be printed, and detecting an ink amount required for printing an entire print region with the average density at an actual size.

Moreover, there is provided a notifying method of notifying a user of an ink amount. The notifying method includes the steps of (a) converting image data into print data, (b) predicting a required ink amount indicating an ink amount required by a printer for performing print operations, the print operations being performed forming a print image on recording medium based on the print data, (c) detecting a remaining ink amount indicating an ink amount remaining in the printer, (d) comparing the required ink amount with the remaining ink amount, (e) determining whether or not the remaining ink amount is sufficient for the printer to perform the print operations, and (f) notifying a user of a determination result of the step (e).

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

Print systems according to preferred embodiments of the present invention will be described while referring to the accompanying drawings.

First, a print system PS-according to a first embodiment of the present invention will be described while referring to FIG. 1. The print system PS includes an information processing terminal 10, a raster image processor (RIP) 10, and a printer 30. The information processing terminal 10 is connected to the RIP 20 by a network 40, such as a local area network (LAN). The printer 30 is connected to the RIP 20 by a line 45. The information processing terminal 10 can be a personal computer, and the printer 30 can be a printer plotter, an ink jet printer, a laser printer, or any other variety of printer.

The print system PS is for printing banners several meters wide and several tens of meters long. The RIP 20 is provided as an external device of the information processing terminal 10 and is connected between the information processing terminal 10 and the printer 30 in order to lighten the processing burden on the information processing terminal 10.

Figure 1:
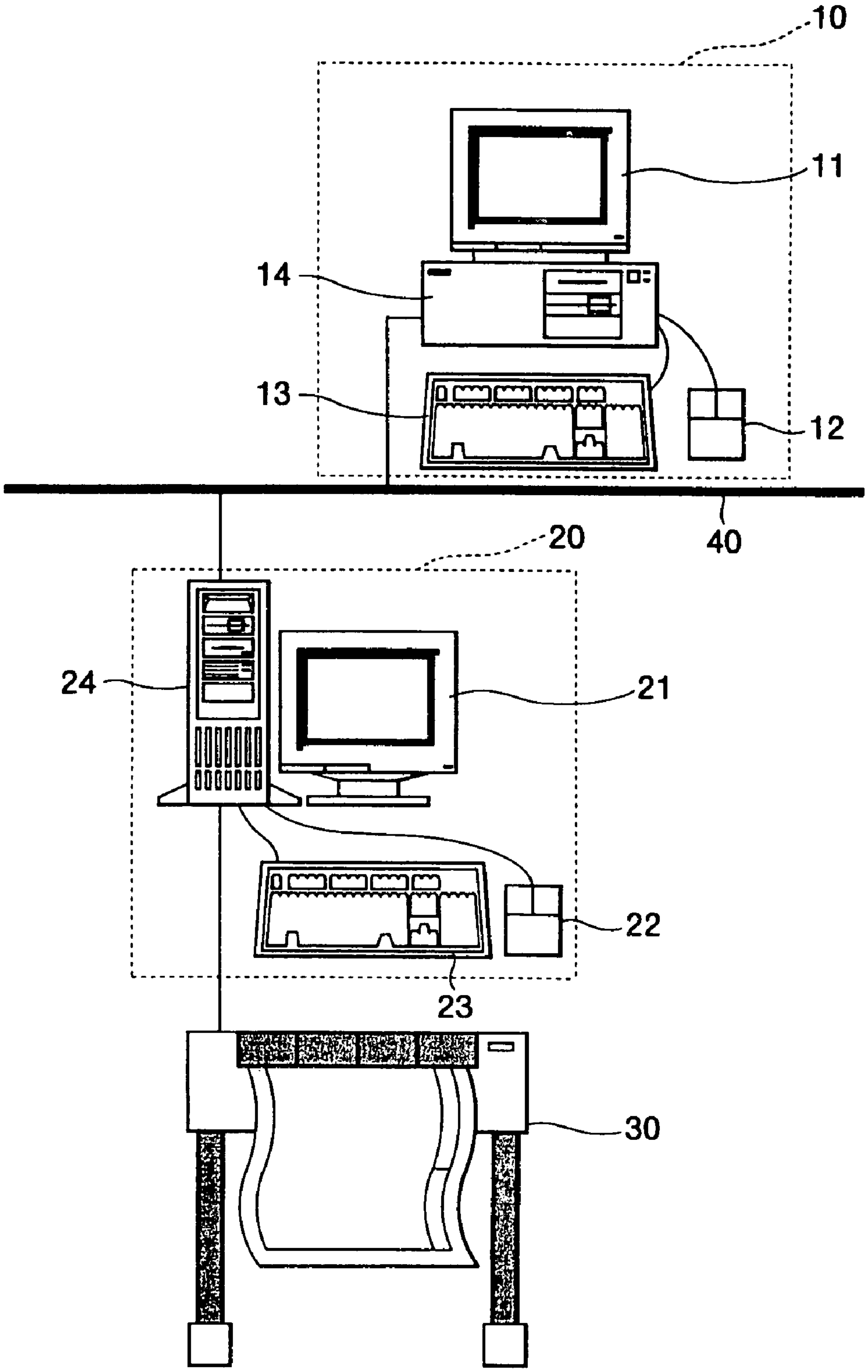
FIG. 1 is a schematic view showing configuration of print system according to a first embodiment of the present invention.

As shown in FIG. 1, the information processing terminal 10 includes a display 11, a mouse 12, a keyboard 13, and a terminal computer 14. Similarly, the RIP 20 includes a display 21, a mouse 22, a keyboard 23, and a RIP computer 24. Although not shown in the drawings, the terminal computer 14 and the RIP computer 24 include a central processing unit (CPU), a random access memory (RAM), a read-only memory (ROM), an input/output-circuit, and a network-interface, all connected to each other by a bus. The display 11, 21, the mouse 12, 22, the keyboard 13, 23 are individually connected to the corresponding computer 14, 24 via the corresponding input/output circuit. Because the computers 14, 24 have a well known configuration, detailed description thereof will be omitted.

The printer 30 is provided with a printing mechanism and a control mechanism. The printing mechanism is for performing print operations for forming an image on a recording medium. The control mechanism includes essentially a CPU, a ROM, and a RAM. The CPU executes print processes to be described later. The printer 30 is an ink jet color printer and performs print operations using four colors of ink, that is, cyan ink, magenta ink, yellow ink, and black ink. The four colors of ink will be referred by C, M, Y, K, respectively, hereinafter.

The information processing terminal 10 generates image data, such as TIFF image data or JPEG image data, based on instructions from a user. When printing is requested by the user, the image data is transmitted to the RIP 20 over the network 40. The RIP 20 converts the image data into print data by executing a predetermined process. The print data may be bit map data developed in dot units which are the basic unit used in printing. Then, the print data is transmitted to the printer 30. Upon receiving the print data, the printer 30 performs print operations based on the print data so as to form an image on a recording medium.

It should be noted that the print system PS according to the present embodiment includes only a single information processing terminal 10 and a single printer 30. However, a plurality of information processing terminals 10 and a plurality of printers 30 can be included. In this case, the information processing terminals 10 are connected to the network 40, and the printers 30 are connected to the RIP 20.

Figure 2:
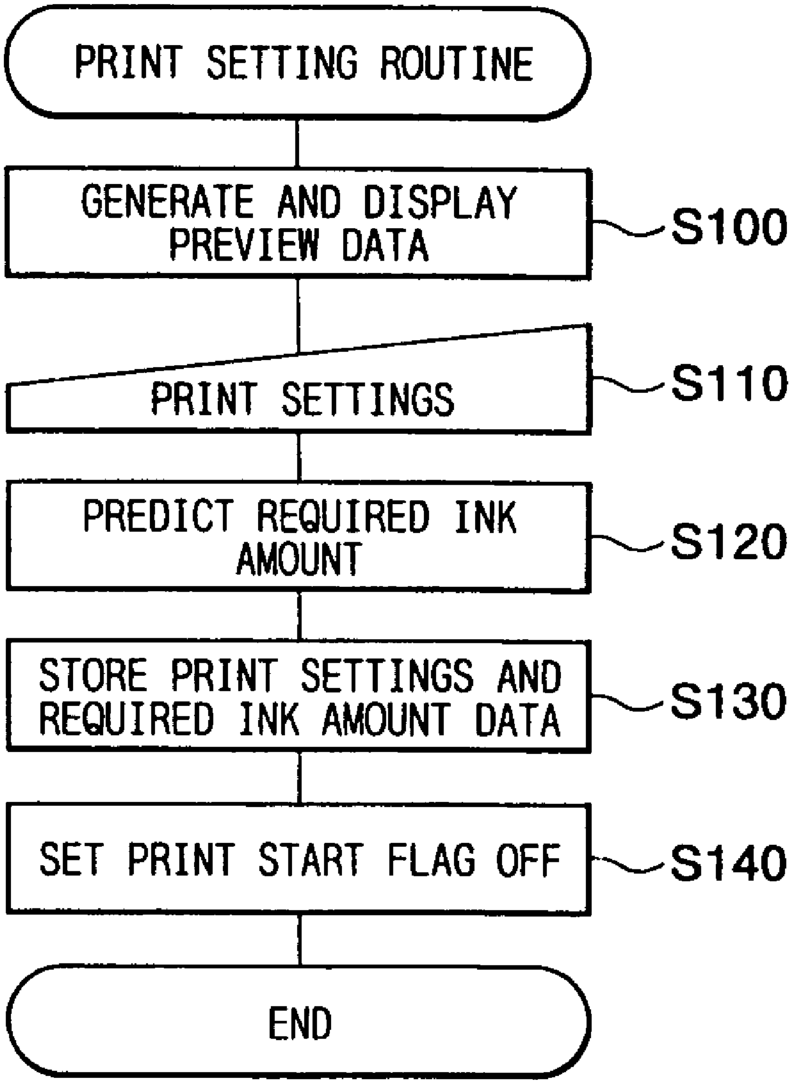
FIG. 2 is a flowchart representing a print setting routine executed by an RIP of the print system of FIG. 1.
Figure 3:
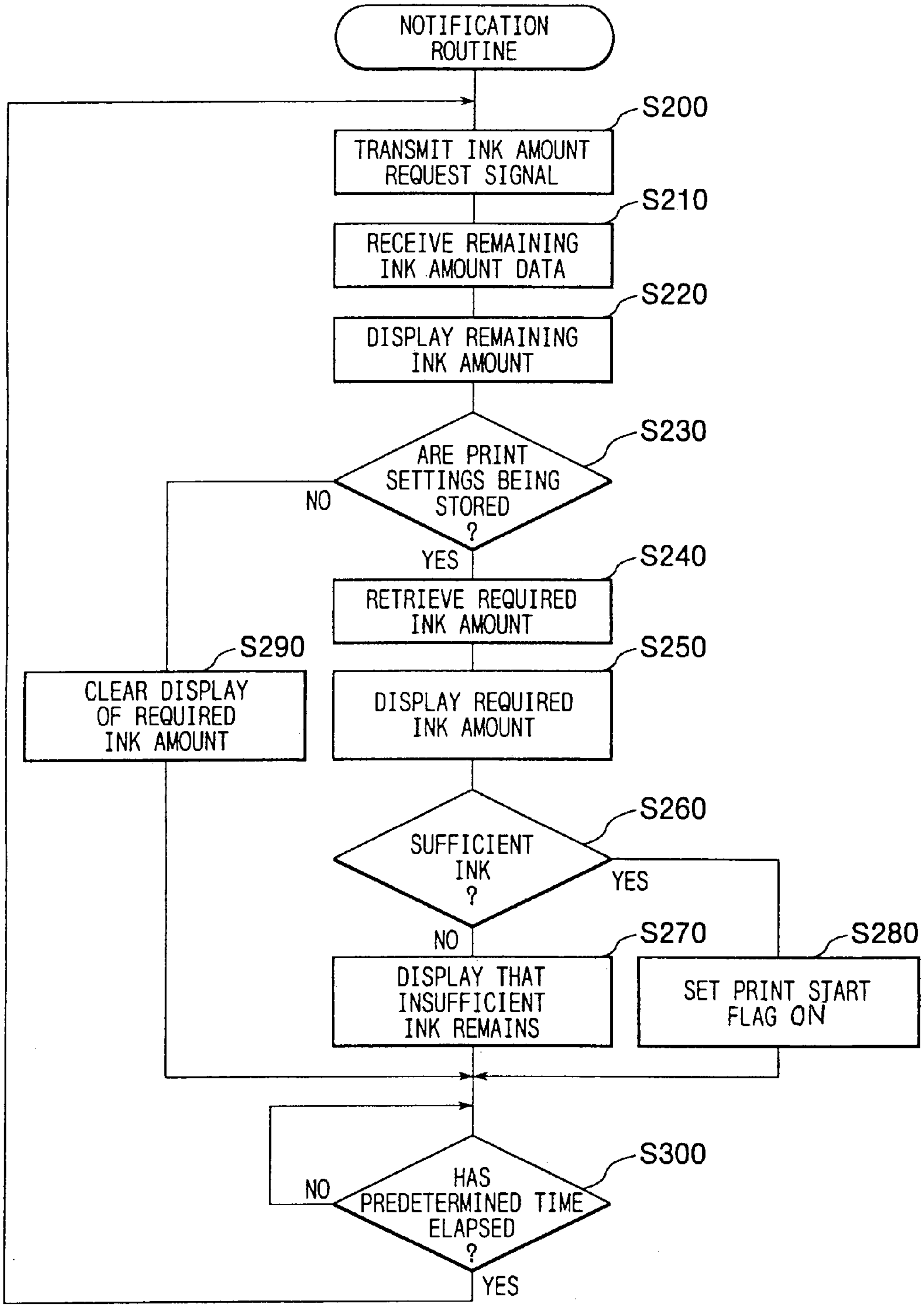
FIG. 3 is a flowchart representing a notification routine executed by the RIP.
Figure 4:
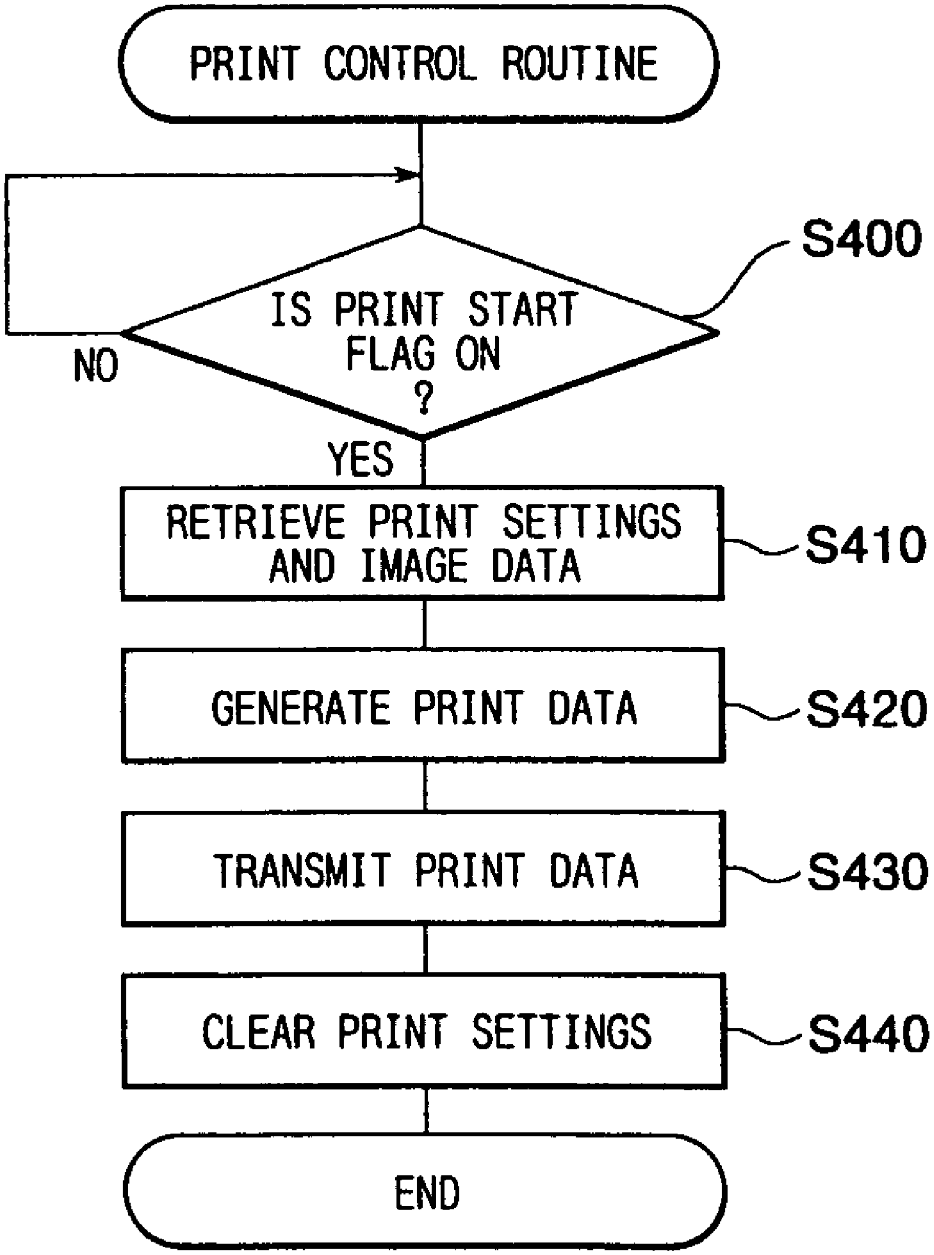
FIG. 4 is a flowchart representing a print control routine executed by the RIP.

Next, control processes executed by the print system PS of the present embodiment will be described while referring to the flowcharts shown in FIGS. 2 to 4. The control processes include a print setting routine, a notification routine, a print control routine, and a print routine.

First, the print setting routine will be described while referring to the flowchart shown in FIG. 2. The print setting routine is executed by the CPU of the RIP computer 24 before print operations are started. It should be noted that in this example, it is assumed that image data has already been received from the information processing terminal 10, and is presently stored in the RAM of the RIP computer 24.

Once the print setting routine is started, first in S100, preview data is generated, and a print preview is displayed on the display 21 of the RIP 20 based on the preview data. The print preview shows an image to be printed in order to enable the user to confirm how the printed image will appear. Generally, the preview data is generated by reducing the size of the image data, and differs from the original image data only by the magnification rate.

Next in S110, the user makes a variety of print settings using the mouse 21 or the key board 23 while examining the image displayed on the display 21. For example, the user sets scaling for magnifying or reducing the size of the image, trims to select a print region, and rotates orientation of the image. After the print settings are set, then the user instructs to start printing.

Next, in S120, an amount of ink required to print out the image data is predicted by referring to the print settings set in S110 and the preview data generated in S100.

Here, an explanation will be provided for a method of predicting the required amount of ink. Usually, a print preview is displayed using red, green, and blue pixels with 256 intensity tones. Tones of a print image are expressed by dot patterns of the four colors of ink C, M, Y, K, or by adjusting the ejection amount of the four colors of ink. The latter method is quite costly, so normally the tones are expressed using the dot pattern. Regardless of which method is used, the ink amount to be used is proportional to the intensity tone of the print preview.

Therefore, in the present embodiment, intensity tones of all pixels of the print preview is averaged and converted into values between zero and one. This value is set as an average density of the image to be printed. Then, the average density is multiplied by an ink amount required for printing the entire print region of the recording medium. The resultant product is considered as the required ink amount for forming the image.

It should be noted that when trimming was performed in S110, the tones of pixels in the remaining portion after trimming are averaged and normalized to obtain the average density of the image. Then, the average density is multiplied by the ink amount required to print the entire trimmed down portion.

It should be also noted that when the print preview is expressed using red, green, and blue colors, and the corresponding image is printed using colored inks C, M, Y, K, then tones of red, green, black color are converted to tones of C, M, Y, K. Then, the average density is obtained using the above described method.

Next in S130, required ink amount data indicating the required ink amount predicted in S120 and the print settings set in S110 are stored in a predetermined print setting region of the RAM of the RIP computer 24.

Next in S140, a print start flag is set to OFF, and the present routine is ended. The print start flag is stored in the RAM of the RIP computer 24, and has two possible values, that is, ON and OFF.

Next, the notification routine will be described while referring to the flowchart shown in FIG. 3. The notification routine is executed by the CPU of the RIP computer 24 for notifying the user of the required ink amount.

Figure 6:
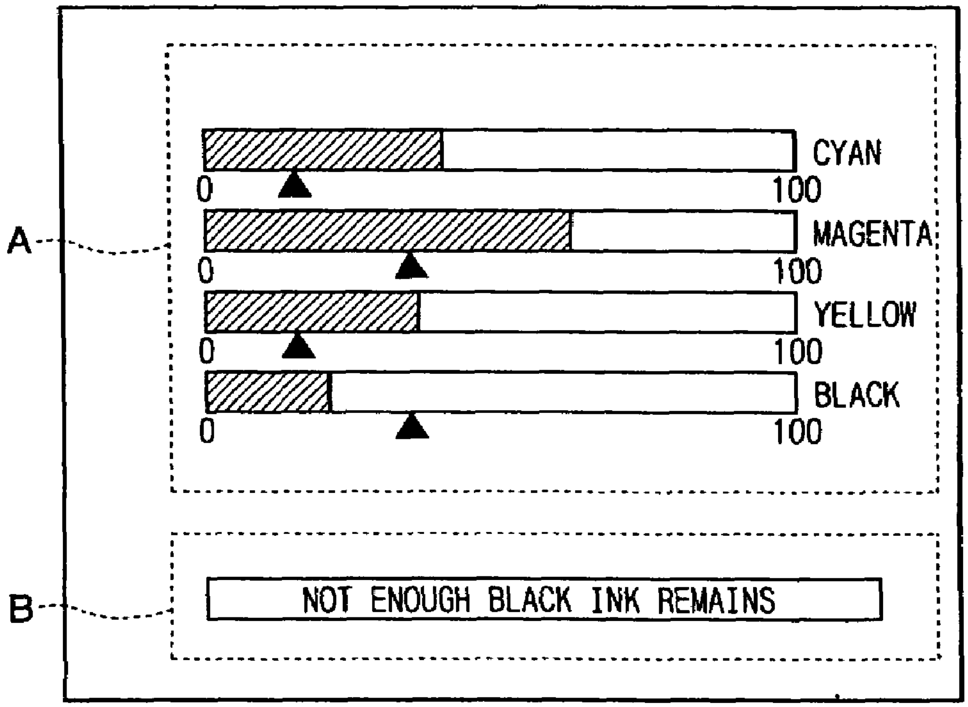
FIG. 6 is a schematic view showing an example of a display screen.

First in S200, the RIP computer 24 transmits an ink amount request signal to the printer 30 for requesting the printer 30 to transmit the remaining ink amount data. Then in S210, the RIP computer 24 receives the remaining ink amount data from the printer 30. In S220, the remaining ink amount is displayed in a graph form on the display 21 as shown in FIG. 6. Specifically, the remaining ink amount is displayed in a central region A of the screen in a bar graph divided by a scale 1 to 100. The hatched region of the bar graph indicates the remaining ink amount.

Next in S230, it is determined whether or not print settings are being stored in the RAM of the RIP computer 24. If so (S230:YES), then the routine proceeds to S240. In S240, the required ink amount data is retrieved from the RAM, and then in S250, the required ink amount is displayed on the display 21. In FIG. 6, the required ink amount is indicated by triangular marks that point to positions on the bar graphs in the region A. If the position indicated by the triangular mark is outside the hatched region, this means that insufficient ink remains in the printer 30. In the example shown in FIG. 6, a sufficient amount of ink remains for C, M, Y, but an insufficient amount of ink remains for B.

Next in S260, it is determined whether a sufficient amount of ink for each color remains in the printer 30. This determination is made by comparing the required ink amount with the remaining ink amount. When insufficient ink remains (S260:NO), then in S270, as shown in FIG. 6, a message is displayed in a region B of the display 21. Because insufficient black ink remains in this example, a message "Not enough black ink" is displayed in this case. Then, the routine proceeds to S300. On the other hand, when sufficient ink remains for all colored inks (S260:YES), then the print start flag is turned ON in S280, and the routine proceeds to S300.

If it is determined in S230 that the print settings are not being stored in the RAM (S230:NO), then in S290, the display of required ink amount is cleared, and the routine proceeds to S300.

In S300, it is determined whether or not a predetermined time duration, such as three seconds, has elapsed. If so (S300:YES), the routine returns to S200. On the other hand, if not (S300:NO), then S300 itself is repeated. In this way, the RIP 20 repeatedly requests the printer 30 to transmit the remaining ink amount at regular intervals. Therefore, after the user replenishes the ink to the printer 30, the display will be updated accordingly.

Next, the print control routine will be described while ref erring to the flowchart of FIG. 4. The print control routine is executed by the CPU of the RIP computer 24 after the print setting routine is executed.

First in S400, it is determined whether or not the print start flag is ON. When the print start flag is ON (S400:YES) then the routine proceeds to S410. On the other hand, if not (S400:NO), this means that the print start flag is OFF. Then, the routine repeats S400.

In S410, the print settings and the image data are retrieved from the RAM of the RIP computer 24. Next in S420, the image data is converted into print data based on the print settings.

Then in S430, the print data is transmitted to the printer 30, and in S440, the print settings are cleared from the RAM. Then, the present routine is ended.

Figure 5:
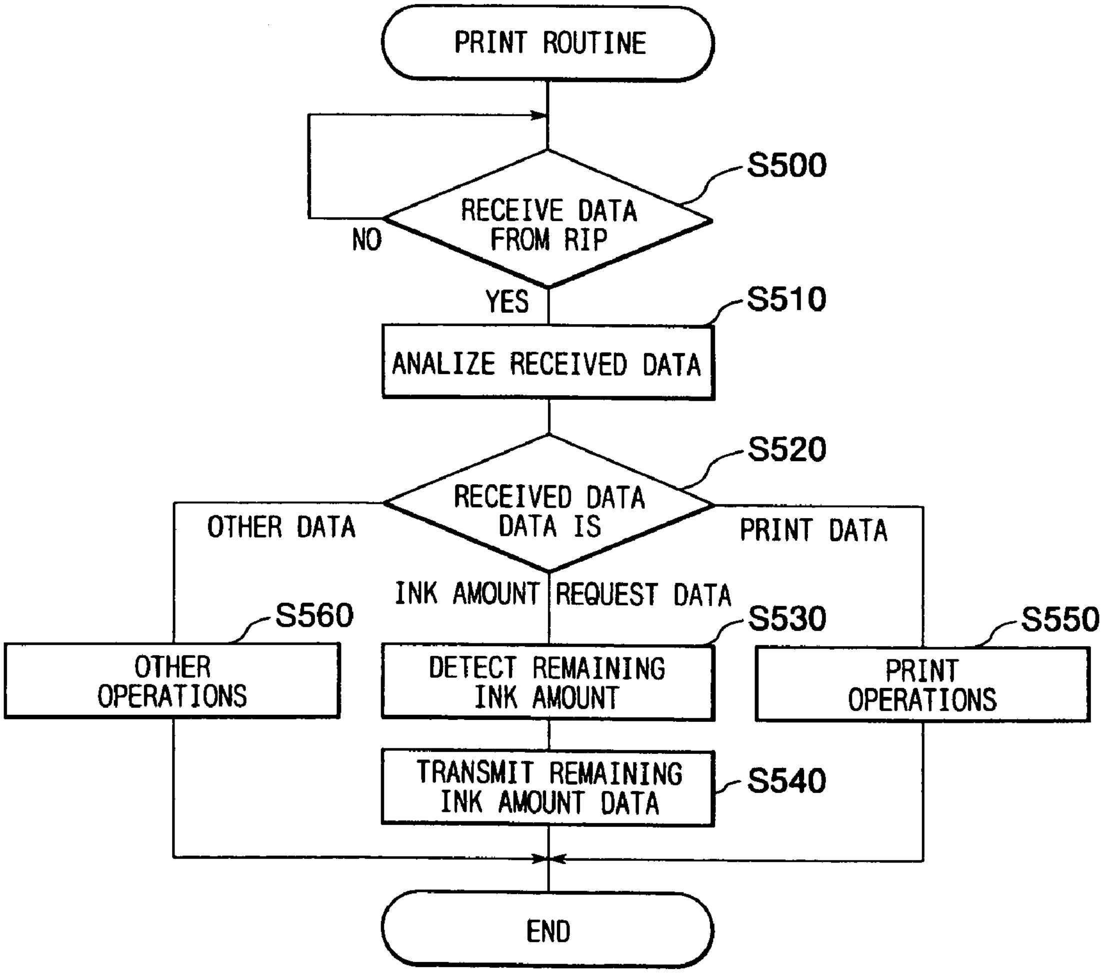
FIG. 5 is a flowchart representing a print routine executed in a printer of the print system of FIG. 1.

Next, the print routine will be described while referring to the flowchart shown in FIG. 5. The print routine is executed by the printer 30 in accordance with the above-described routines.

First, in S500, it is determined whether or not data has been received from the RIP 20. If so (S500:YES), then the routine proceeds to S510. On the other hand, if not (S500: NO), then S500 is repeated until data is received.

In S510, the data received from the RIP 20 is analyzed, then in S520, the type of received data is determined based on the analysis performed in S510. If the received data is determined to be an ink amount request signal, then in S530, the printer 30 detects the remaining ink amount. Next in S540, the printer 30 transmits the remaining ink amount data to the RIP 20, and the present routine is ended.

If it is determined in S520 that the received data 20 is print data, then the routine proceeds to S550, wherein print operations are performed based on the print data for forming an image on a recording medium. Then, the present routine is ended.

If it is determined in S520 that the received data is not an ink amount request signal nor print data, then routine proceeds to S560 to execute processes depending on the type of the received data. Then, the present routine is ended.

According to the above-described print system PS, before print operations are started, the remaining ink amount and required ink amount are displayed in a manner that enables comparison of the two. When insufficient ink remains, a message is also displayed to notify the user so. With this configuration, the user can replenish ink before print operations are started. Therefore, the ink can be prevented from running out in the middle of printing.

Also, the RIP 20 outputs the ink amount request signal to the printer 30 and receives the remaining ink amount data at a regular interval. With this configuration, after the user replenishes ink, the RIP 20 will receive updated remaining ink amount data, and the display of the remaining ink amount is updated. Therefore, after ink has been replenished, it is determined and displayed whether or not ink will run out during printing. This enables the user to confirm whether or not the amount of replenished ink is sufficient, and it is very convenient for the user. Also, because the printer 30 is a full color printer, there is a possibility that the user may replenish a wrong colored ink. However, in this case, the user is very likely to realize his or her mistake by viewing the updated screen.

When the required ink amount is calculated based on the original image data for a large banner, such as a A0 sized or larger banner, a great deal of calculation time is required. For example, if a personal computer with a clock speed of several one hundred mega bits is used to calculate the required ink amount to print the A0 sized banner, then several minutes or several tens of minutes may be required. This is because the calculation process is substantially the same as the actual print operations. However, the print preview corresponding to the preview data has a smaller number of pixels than the image corresponding to the original image data. Therefore, less time is required to calculate the required ink amount based on the preview data than based on the original image data.

It should be noted that in the above-described embodiment, the remaining ink amount and the required ink amount are displayed on the display 21 of the RIP 20. However, the remaining ink amount and the required ink amount can be displayed on the display 11 of the information processing terminal 10. In this case, the RIP 24 can be provided with a program for functioning as a web server, and the information processing terminal 10 can be provided with a program for functioning as a web browser. The RIP 20 as the web server periodically transmits the required ink amount data and the remaining ink amount data in S220, S250, respectively, to the information processing terminal 10 as the web browser. Based on the remaining ink amount data and the required ink amount data, the information processing terminal 10 executes a JAVA program for displaying the graph shown in FIG. 6 in S260 to S280. Also, the information processing terminal 10 transmits a signal to the RIP 20 so as to indicate whether the print start flag should be turned ON or OFF.

Alternatively, the remaining ink amount and the required ink amount can be displayed on both the display 21 and the display 11. Also, the remaining ink amount and the required ink amount can be notified to the user audibly using a synthesized voice.

According to the embodiment, the remaining ink amount and the required ink amount are displayed for each different colored ink using the graph shown in FIG. 6. However, the required ink amount and the remaining ink amount can be displayed on separate graphs or numerically shown side by side to facilitate comparison.

Alternatively, the exact amount of ink that needed to be replenished can be notified to the user when insufficient ink remains. With this configuration, the user need not personally determine how much ink should be replenished. This makes the print system PS much more convenient for the user.

In the embodiment described above, the printer 30 transmits the remaining ink amount data to the RIP 20 in response to the ink amount request signal from the RIP 20. However, any method can be used that enables the RIP 20 to obtain the remaining ink amount. For example, the RIP 20 can store initial ink amount data when ink is replenished to the printer 30, and the printer 30 can transmit the cumulative amount of ink consumed by the printer 30 from the last time the ink was replenished. Then, the RIP 20 can calculate the remaining ink amount.

Rather than the ink jet printer 30, the present invention can be applied to printers that use an ink ribbon and that use toner particles because these types of printer could also benefit from the feature of notifying a user that insufficient consumables remain, before printing starts.

As described above, the required ink amount can be calculated in a short time based on the preview data. Also, because the average density of the image is determined based on the intensity tones of the print preview, the required ink amount can be obtained more accurately. That is, the above described method is a good balance of conflicting interests of short calculation time and accurate calculation for determining the required ink amount.

However, if it is considered more important to reduce the calculation time, then any of the following three methods can be used. In a first method, the amount of ink required to print an entire print region of a recording medium is used as the required ink amount in a second method, density of a previously printed image is averaged. The density indicates a rate of printed dots with respect to the total number of dots at the actual print size. Then, the average density is multiplied by an ink amount required for printing the entire print region, thereby obtaining the required ink amount. In a third method, a maximum density of all previously printed images is stored. Then, the maximum density is multiplied by an ink amount required for completely printing an entire print region, thereby obtaining the required ink amount. None of the above-described three methods calculates the density of the image to be printed, so that the time required for this prediction can be reduced.

On the other hand, when accuracy of required ink amount is considered more important, then the following method can be utilized. That is, when tones of an image to be printed are to be expressed using dot patterns, each dot of the image corresponds to one bit of print data for each color. Accordingly, the required ink amount can be predicted by adding the numbers "1" in the bit map data, that is, the number of dots wherein ink will be ejected. Using this method, the amount of required ink can be very accurately predicated.

Figure 7:
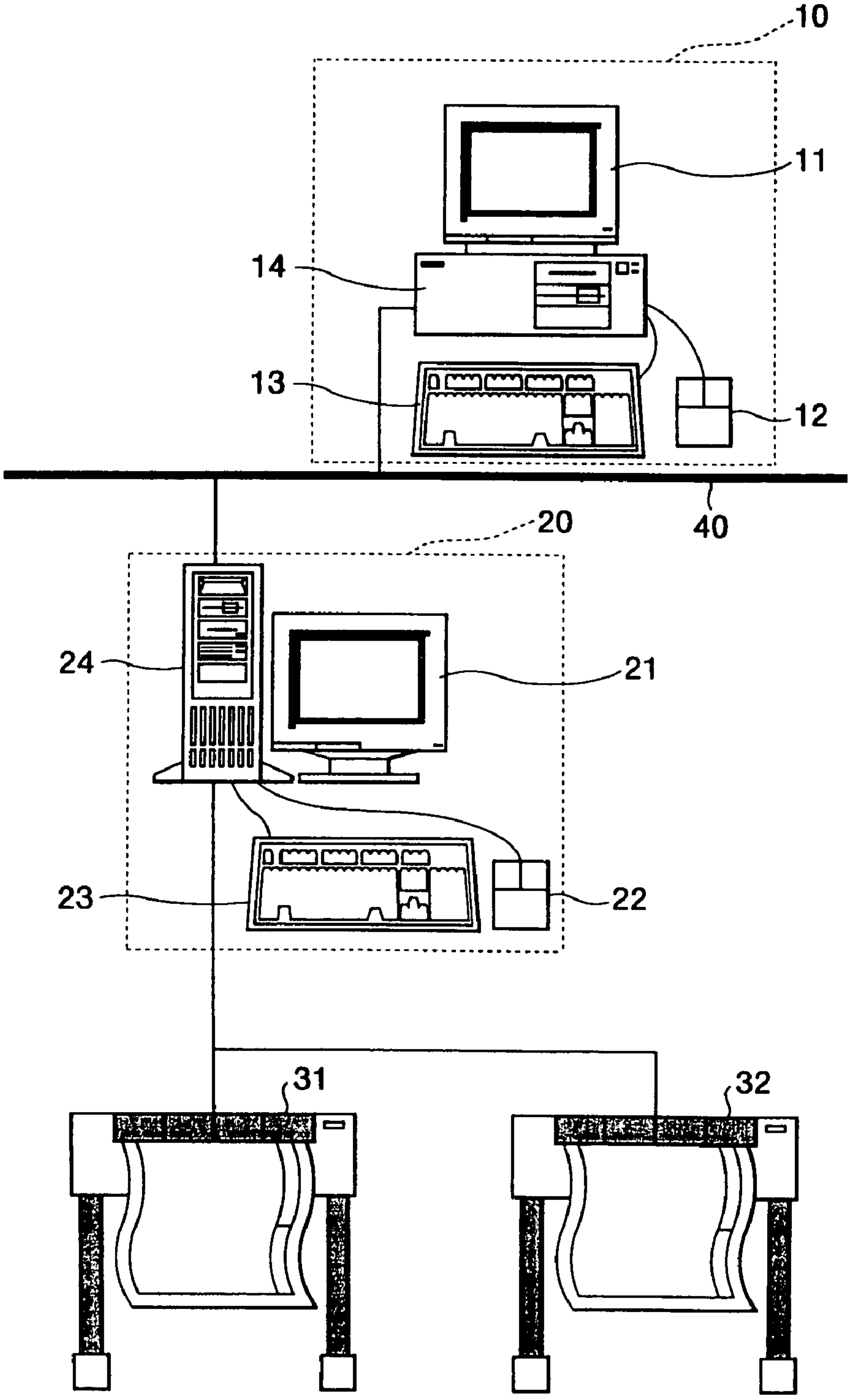
FIG. 7 is a schematic view showing configuration of print system according to a second embodiment of the present invention.

Next, a print system PS2 according to a second embodiment of the present invention will be described while referring to FIGS. 7 to 13. As shown in FIG. 7, the print system PS2 is similar to the print system PS of the first embodiment shown in FIG. 1. However, the print system PS2 includes a first printer 31 and a second printer 32 both connected to the RIP 20. This is merely to facilitate understanding of the present invention, and the printer system PS2 can include only a single printer or more than two printers. The first and second printers 31, 32 have the same configuration and function as those of the printer 30. Because the configuration of the print system PS2 is similar to that of the print system PS, its detailed description will be omitted.

Next, control processes executed in the print system PS2 will be described. The control processes include a notification routine, a screen preparation routine, and a display routine.

Figure 8:
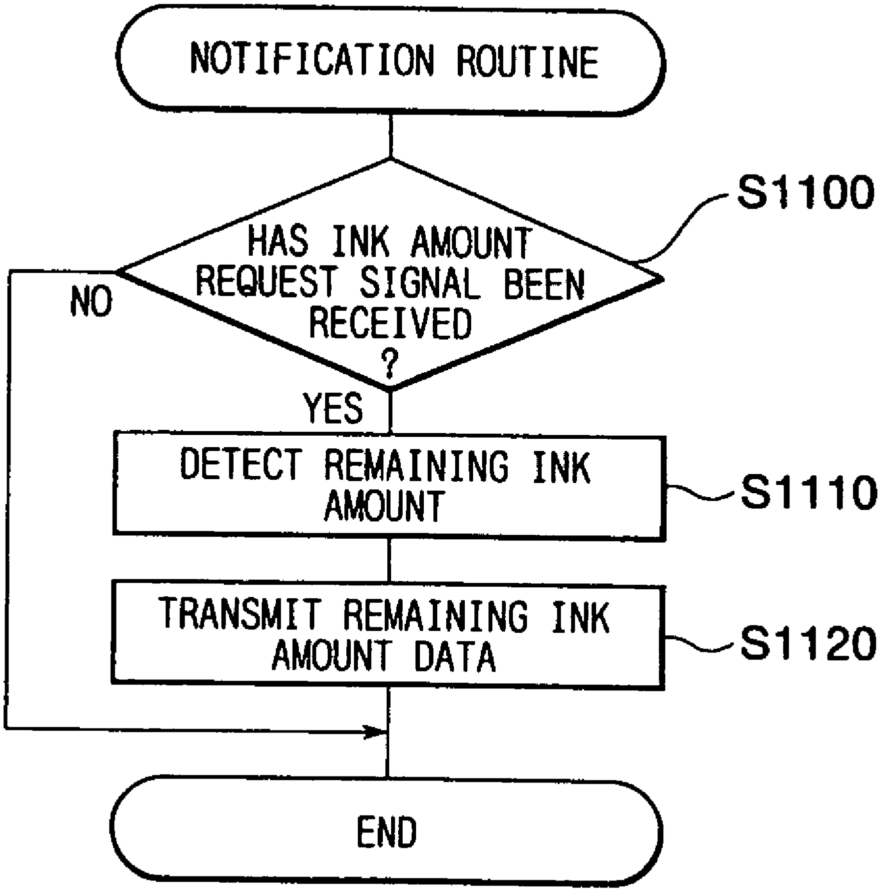
FIG. 8 is a flowchart representing a notification routine executed by a printer of the print system of FIG. 7.
Figure 9:
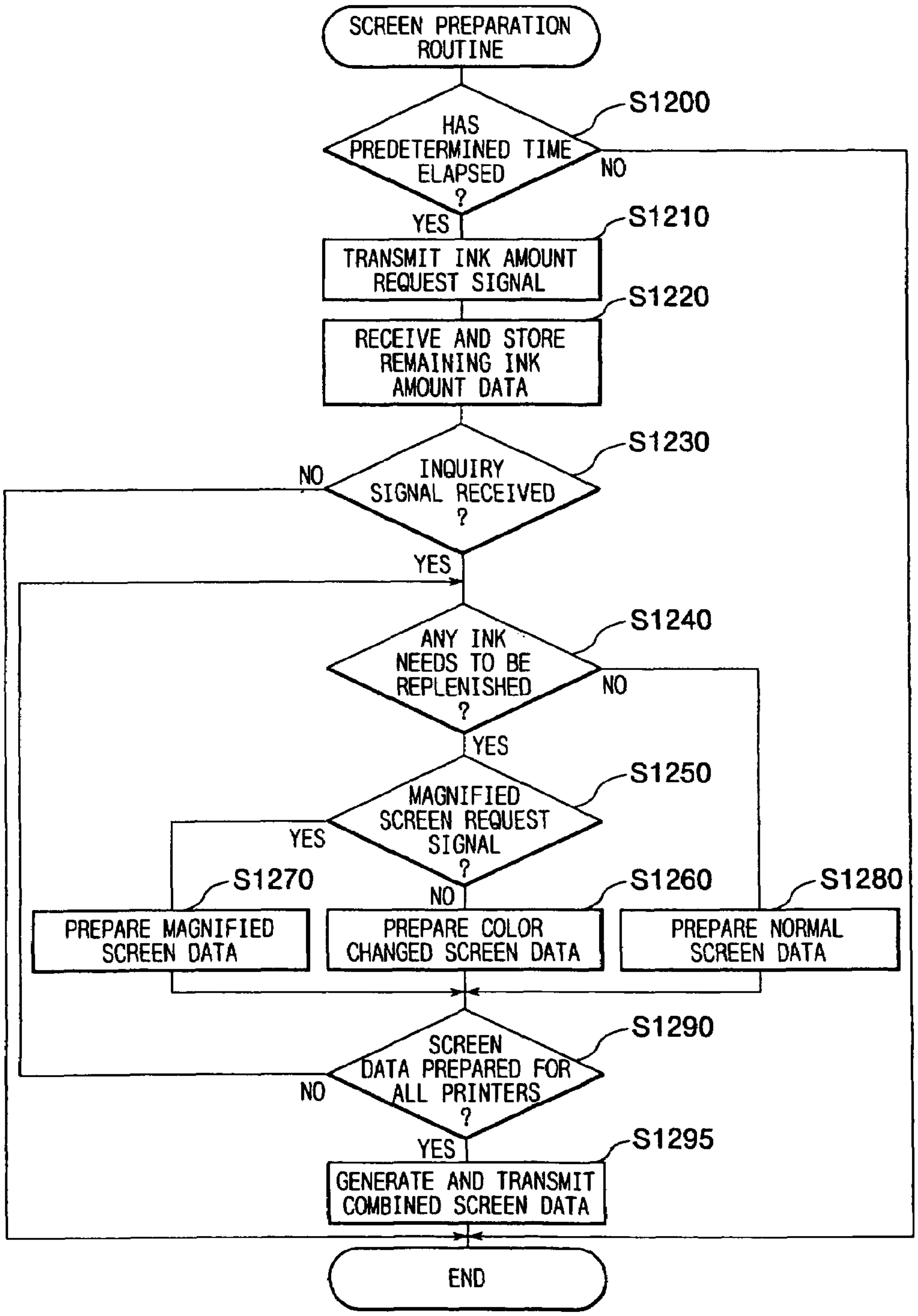
FIG. 9 is a flowchart representing a screen preparation routine executed by a RIP of FIG. 7.

First, the notification routine will be described while referring to the flowchart shown in FIG. 8. The notification routine is executed in each of the first and the second printers (hereinafter collectively referred to as "printers") 31, 32 by its CPU.

First, in S1100, it is determined whether or not an ink amount request signal has been received from the RIP 20. If so (S1100:YES), then the routine proceeds to S1110. On the other hand, if not (S1100:NO), then the present routine is ended.

In S1110, a remaining ink amount is detected for each colored ink, and in S1120, remaining ink amount data indicating the remaining ink amount is transmitted to the RIP 20. Then, the present routine is ended.

Next, the screen preparation routine will be described while referring to the flowchart shown in FIG. 8. The screen preparation routine is repeatedly executed by the RIP computer 24.

First in S1200, it is determined whether or not a predetermined time duration, such as, three seconds, has elapsed. If not (S1200:NO), then the present routine is ended. On the other hand, if so (S1200:YES), then the routine proceeds to S1210.

In S1210, an ink amount request signal is transmitted to the printers 31, 32 to request the printers 31, 32 to transmit remaining ink amount data. Then, in S1220, the remaining ink amount data is received from the printers 31, 32, and stored in the RAM of the RIP computer 24. Then, in S1230, it is determined whether or not an inquiry signal has been received from the information processing terminal 10. If not (S1230:NO), then the present routine is ended. On the other hand, if so (S1230:YES), then the routine proceeds to S1240.

In S1240, on the remaining ink amount data, it is determined whether or not it is time to replenish ink based. In the present embodiment, it is determined whether or not remaining ink amount of each color has dropped below ten percent of the maximum capacity of an ink tank of the printers 31, 32. When it is determined that it is not time to replenish ink (S1240:NO), then normal screen data is prepared as screen data in S1280, and the routine proceeds to S1290.

Figure 11:
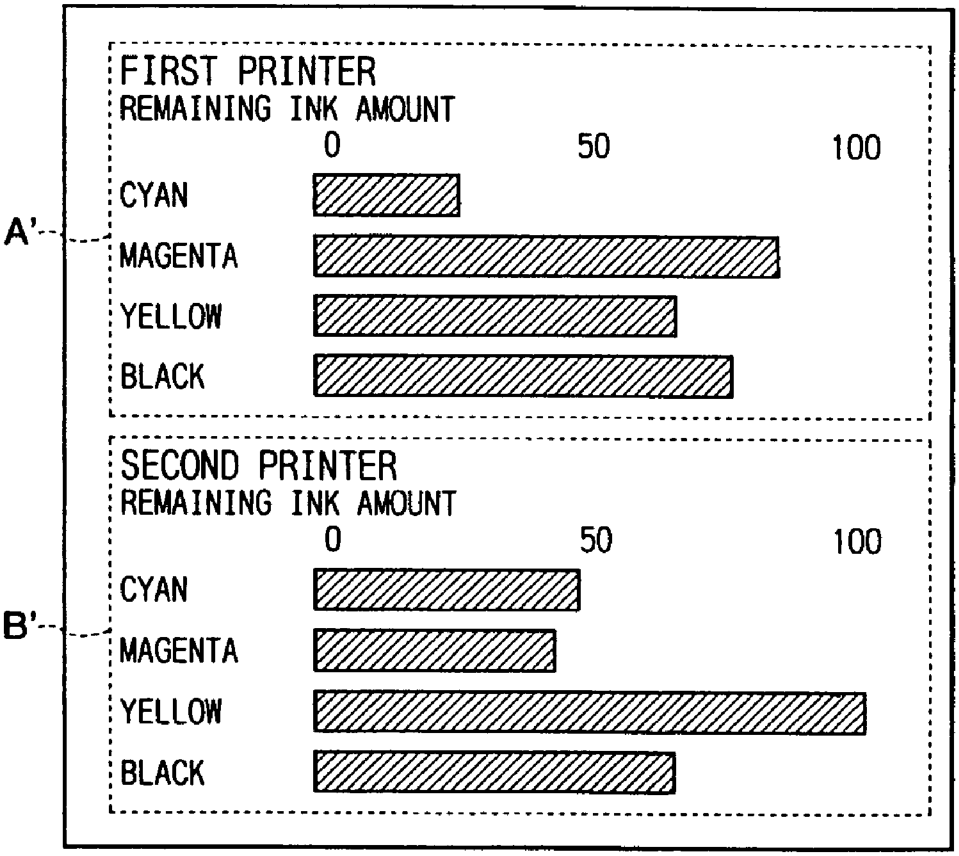
FIG. 11 is a schematic view showing an example of a screen.

FIG. 11 shows an example of the normal screen displayed based on the normal screen data. In this example, the normal screen for the printer 31 is displayed in an upper region A' of the screen based on the normal screen data for the printer 31. Also, the normal screen for the printer 32 is displayed in a lower region B' based on the normal screen data for the printer 32.

If it is determined in S1240 that it is time to replenish ink (S1240:YES), then the routine proceeds to S1250. In S1250, it is determined whether or not the request signal received from the terminal 10 is a magnified-screen request signal. If not (S1250:NO), then the routine proceeds to S1260.

In S1260, color changed screen data is generated as screen data. The color changed screen data is for displaying a screen wherein a graph for a colored ink with an insufficient remaining amount is displayed in a different color from the graphs for other colors. For example, a color changed screen based on the color changed screen data is shown in the upper region A' in FIG. 12. In this example, the graph for the cyan ink has pure black color while the graphs for remaining ink is hatched. In this way, the user is notified that remaining amount of the cyan ink is insufficient, and that the cyan ink needs to be replenished. Then, the routine proceeds to S1290.

Figure 13:
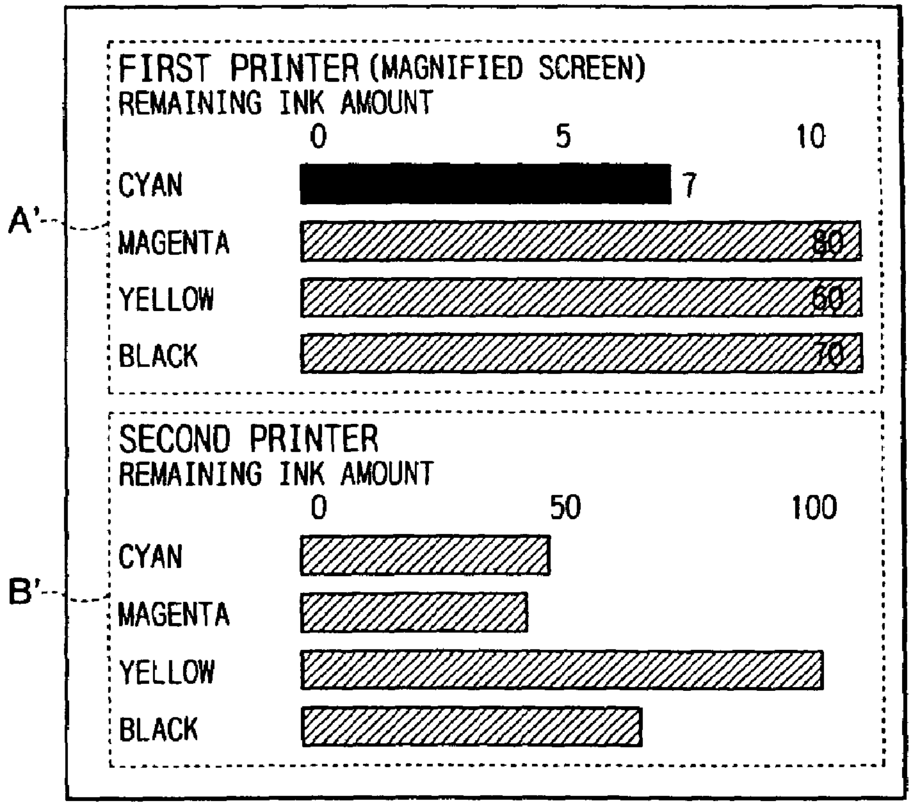
FIG. 13 is a schematic view showing an example of a screen.

On the other hand, if it is determined in S1250 that the request signal is a magnified-screen request signal (S1250:YES), then in S1270, magnified screen data is generated as screen data. FIG. 13 shows an example of a magnified screen displayed in the upper region A' based on the magnified screen data. As shown in FIG. 13, the upper region A' displays magnified graphs and scales by 10 times that displayed in the lower region B'. In the magnified screen displayed in the upper region A', the remaining ink amount of each color is also displayed numerically from 0 to 100 This is because although the remaining amount of cyan ink can be graphically shown in a magnified scale of 0 to 10 percent, the remaining ink amount of other inks cannot be perceived using the magnified graph alone. Then, the routine proceeds to S1290.

Figure 12:
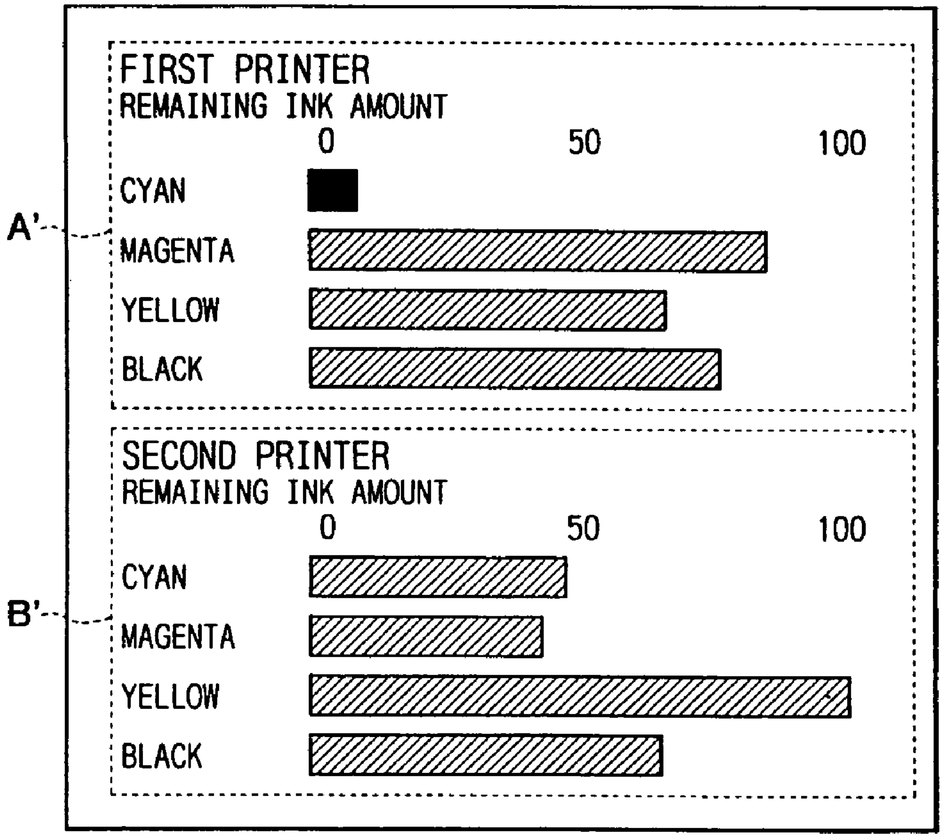
FIG. 12 is a schematic view shown in an example of a screen.

In S1290, it is determined whether or not screen data has been generated for all printers 31, 32. If not (S1290:NO), then the routine returns to S1240. On the other hand, if so (S1290:YES), then in S1295, all screen data for the printers 31, 32 is combined so that as shown in FIGS. 11 to 13, the remaining ink amounts in the printers 31, 32 can be displayed in the upper and lower regions A', B', respectively, in a single screen. Next also in S1295, the combined data is transmitted to the information processing terminal 10, and then, the present routine is ended.

Figure 10:
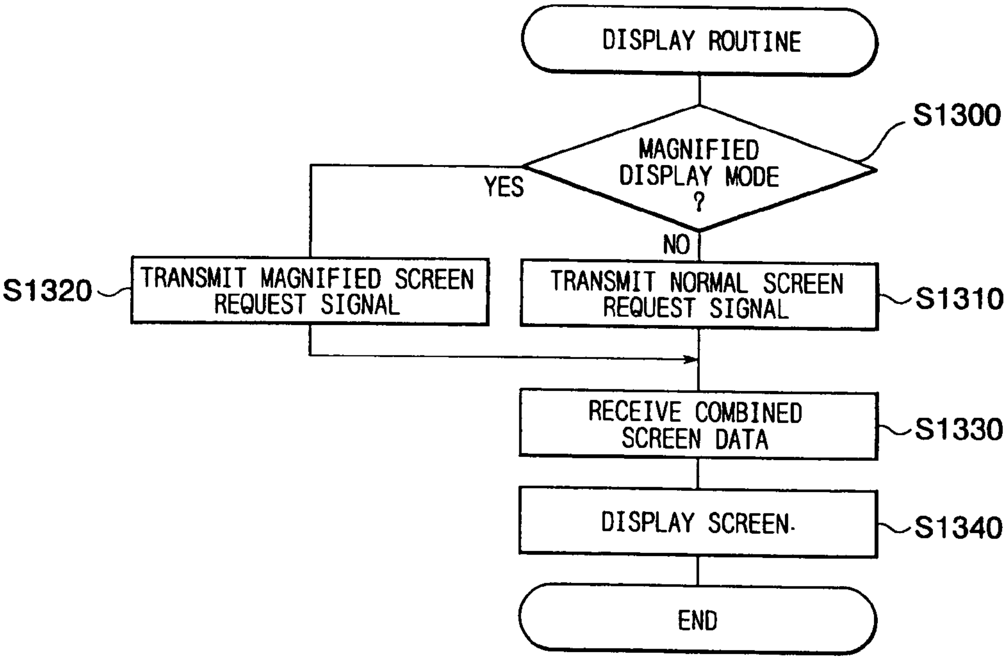
FIG. 10 is a flowchart representing a display routine executed by an information processing terminal of the print system of FIG. 7.

Next, the display routine will be described while referring to the flowchart shown in FIG. 10. The display routine is executed by the CPU of the terminal computer 14.

First in S1300, it is determined whether or not a magnified display mode has been selected for a subject printer 31, 32 by a user. It should be noted that the user can select either the magnified display mode or a normal display mode for each printer 31, 32 using the mouse 12 or the keyboard 13. The magnified display mode is for displaying the graphs in a magnified form, that is, in the form displayed in the upper region A' of FIG. 13. The normal display mode is for displaying the graphs is in a normal size, that is, in the form displayed in the lower region B' of FIG. 13.

If it is determined in S1300 that magnified display mode has been selected (S1300:YES), then in S1320, the magnified-screen request signal is transmitted to the RIP 20. Then, the routine proceeds to S1330. On the other hand, if not (S1300:NO), then in S1310, a normal-screen request signal 20 is transmitted to the RIP 20, then the routine proceeds to S1330.

In S1330, the combined screen data is received from the RIP 20. Next in S1340, a screen is displayed based on the combined screen data. Examples of the screen are shown in FIGS. 11 to 13. Then, the routine is ended.

According to the second embodiment described above, the graph for insufficient ink is displayed in a color different from that for the other ink. Therefore, the user can easily grasp the timing to replenish ink.

Also, because the magnified screen is displayed, the user can accurately grasp the remaining amount of ink even if the ink has run low, and it is very convenient for the user. For example, even if a message is displayed for urging the user to replenish a certain colored ink, when the user knows that the certain color of ink is not used very frequently, the user can determine whether or not the printing can be continued without replenishing the ink by referring to the magnified screen.

Moreover, because the remaining ink amount of the plurality of printers 31, 32 is displayed on a single screen, the user can easily determine which printer 31, 32 to select to perform printing.

It should be noted that in the print system PS2, the remaining ink amount in the printer 31, 32 can be displayed on the display 21 of the RIP 20 rather than the display 11 of the information processing terminal 10. Alternatively, the remaining ink amount can be displayed both on the displays 11, 21. When the remaining ink amount is displayed on the display 21, processes for displaying a screen, that is, the same processes of S1340, are executed after S1295 by the CPU of the RIP computer 24.

Also, in the above embodiment, the RIP 20 determines the time to replenish ink and generates the screen data based on the request signal from the information processing terminal 10. However, these processes can be executed by the information processing terminal 10.

Further, the invention can be applied to notify a user of timing to replenish any consumable, such as recording medium, which is consumed during printing, and is not limited to ink.

Moreover, according to the present embodiment, the printers 31, 32 detect the remaining ink amount, and the RIP 20 displays the detected remaining ink amount. Therefore, the user can grasp an accurate remaining ink amount. However, the RIP 20 can be configured to calculate the remaining ink amount. Specifically, the RIP 20 stores an initial ink amount when the ink is replenished. Then, the RIP 20 determines how much ink has been consumed after ink has been replenished based on the amount of print data transmitted to each printers 31, 32. The remaining ink amount can be obtained by subtracting the consumed ink amount from the initial ink amount. In this case, there is no need for the printers 31, 32 to detect the remaining ink amount.

Instead of using a display, a synthesized voice message, such as "cyan colored ink needs to be replenished", can be outputted to notify the user of the remaining ink amount. Also, in the normal display, the remaining ink anount can be displayed graphically and numerically or can be displayed numerically only rather than using the graphs divided in a scale of 0, 50, 100.

According to the print system PS2 of the embodiment, the RIP 20 receives the remaining ink amount periodically at a predetermined timing. When an inquiry signal is received from the information processing terminal 10, the combined screen data is generated and transmitted to the information processing terminal 10. That is, the remaining ink amount of the printers 31, 32 at the time when the inquiry signal is transmitted is notified to the user regardless of whether in middle of the printing or before printing has started.

Condition of the printers 31, 32, such as "printing", "paper jam", "waiting". "power off", and the like can be also displayed along with the remaining ink amount. In this case, in S1110, S1120, the printers 31, 32 detects its present condition, and transmits condition data indicating the condition to the RIP 20 along with the remaining ink amount. Also, in S1210, the RIP 20 transmits condition data request signal to the printers 31, 32 along with the ink amount request signal.

In S2220, the RIP 20 receives and stores both the condition data and the remaining ink amount data. Then, in S1260 through S1280, screen data including the remaining ink amount data and the condition data is generated. With this configuration, the user can easily compare and grasp the conditions of the printers 31, 3, and can determine which one of the printers 31, 32 to select for printing operations.

In the above embodiment, the user determines which one of the printers 31, 32 to select based on the display. However, the print system PS2 can be modified so the RIP 20 can automatically select one of the printers 31, 32 based on the condition data and remaining ink amount data when original data is first received from the information processing terminal 10. For example, a printer with the most ink or a printer that is not being used can be selected.

While the invention has been described in detail with reference to specific embodiments thereof, it would be apparent to those skilled in the art that various changes and modifications may be made therein without departing from the spirit of the invention, the scope of which is defined by the attached claims.

For example the ink can be ink produced by binding pigment using oil or resin, liquid ink formed from pigment and water or oil based solvent, toner that is drawn toward a charged portion and fixed in place by a heat, or an ink ribbon.

What is claimed is:

1. A print system comprising:

a terminal that generates image data;

at least one printer that performs print operations for forming an image on a recording medium using an ink based on print data; and a printer controller that is connected between the terminal and the printer and converts the image data into the print data;

wherein the printer controller comprises:

predicting means for predicting a required ink amount indicating an amount of ink required for the printer to perform the print operations based on the print data;

a memory that stores required ink amount data indicating the required ink amount; and transmitting means for transmitting a request signal to the printer, the request signal requesting the printer to transmit remaining ink amount data indicating a remaining ink amount which indicates an amount of ink remaining in the printer;

the printer comprises:

managing means for managing the remaining ink amount data; and transmitting means for transmitting the ink amount data in response to the request signal; and at least one of the terminal and the printer controller comprises:

receiving means for receiving the remaining ink amount data from the transmitting means of the printer;

retrieving means for retrieving the required ink amount data stored in the memory;

determination means for determining based on the remaining ink amount data and the required ink amount data, whether or not the remaining ink amount is sufficient to complete the print operations, based on the print data, before the print operations are started;

notifying means for notifying a user of a determination result determined by the determination means, the notifying means notifying the user before the print operations are started and data-transmitting means for transmitting the print data to the printer only if the determining means has determined that the remaining ink amount is sufficient to complete the print operations based on the print data wherein the printer performs the print operations based on the print data transmitted from the data-transmitting means.

2. The print system according to claim 1, wherein the determination means further determines how much ink is short when the remaining ink amount is determined to be not sufficient, and the notifying means notifies the user of how much ink is short.

3. The print system according to claim 1, wherein the transmitting means of the printer controller repeatedly transmits the request signal at a predetermined interval.

4. The print system according to claim 1, wherein the printer controller further comprises preview data generating means for generating preview data based on the image data, the preview data being generated by reducing a size of the image data, and the predicting means predicts the required ink amount based on the preview data.

5. The print system according to claim 4, wherein the predicting means comprises:

average tone calculation means for calculating an average tone of pixels making up a preview image, the preview image being formed based on the preview data;

average density calculation means for calculating an average density of the image to be formed based on the average tone; and ink amount calculation means for calculating, as the required ink amount, an ink amount for forming the image with the average density at an actual size.

6. The print system according to claim 1, wherein at least one of the terminal and the printer controller further comprises an another memory that stores the remaining ink amount data, and another determination means for determining whether or not ink needs to be replenished to the printer based on the remaining ink amount data stored in the memory; and the notifying means further notifies the user that the ink needs to be replenished when the another determination means determines that the ink needs to be replenished.

7. The print system according to claim 6, wherein the notifying means comprises a display that notifies the user of the remaining ink amount by displaying at least one of a normal sized graph and a magnified sized graph, the display displaying the magnified sized graph when instructed by a user or when the another determination means determines that the ink needs to be replenished.

8. The print system according to claim 6, further comprising a plurality of printers, wherein the memory stores the remaining ink amount data received from the transmitting means of each of the plurality of printers;

at least one of the terminal and the printer controller further comprises data editing means for editing the remaining ink amount data received from the transmitting means of each of the plurality of printers into single data; and the notifying means notifies the user of the remaining ink amount of each of the plurality of printers in a form that enables the user to compare the remaining ink amount of each of the plurality of printers.

9. The print system according to claim 8, wherein the printer controller further includes condition detecting means for detecting a condition of the printers;

the managing means further manages condition data indicating the condition of the printers;

the notifying means notifies the user of the remaining ink amount and the condition of the printers based on the remaining ink amount data and the condition data in a form that enables the user to compare the remaining ink amount and the condition of the plurality of printers.

10. The print system according to claim 9, wherein the printer controller further comprises printer selecting means for selecting, based on at least one of the remaining ink amount data and the condition data, one of the plurality of printers which performs the print operations.

11. The print system according to claim 1, wherein the printer performs the print operations using a plurality of different colors of ink;

the predicting means predicts the required ink amount for each of the different colors;

the managing means manages the remaining ink amount data indicating the remaining ink amount for each of the different colors; and the determination means determines whether or not the remaining ink amount is sufficient for each of the different colors.

12. The print system according to claim 11, wherein the notifying means comprises a display that displays graphs, and the notifying means further notifies the user of the remaining ink amount and required ink amount of each of different colors by displaying the graphs each indicating the remaining ink amount and required ink amount of corresponding one of the different colors.

13. A printer controller connected between a terminal and a printer, the terminal generating image data, the printer performing print operations for forming an image on a recording medium based on print data, the printer transmitting remaining ink amount data indicating an amount of ink remaining in the printer in response to a request signal from external devices, the printer controller comprising:

converting means for converting the image data into the print data;

predicting means for predicting, based on the image data, a required ink amount indicating an ink amount required by the printer for performing the print operations based on the print data;

transmitting means for transmitting the request signal to the printer;

receiving means for receiving the remaining ink amount data from the printer;

determination means for determining, before the print operations start, whether the remaining ink amount is sufficient for the printer to complete the print operations, based on the print data; and notifying means for notifying a user of determination results determined by the determination means before a printing operation based on the print data is started at the printer, wherein the transmitting means further transmits the print data to the printer only if the determination means has determined that the remaining ink amount is sufficient.

14. A printer controller connected between a terminal and a printer, the terminal generating image data, the printer performing print operations for forming an image on a recording medium based on print data, the printer transmitting remaining ink amount data indicating an amount of ink remaining in the printer in response to a request signal from external devices, the printer controller comprising:

converting means for converting the image data into the print data;

predicting means for predicting, based on the image data, a required ink amount indicating an ink amount required by the printer for performing the print operations based on the print data;

first transmitting means for transmitting the request signal to the printer;

receiving means for receiving the remaining ink amount data from the printer;

determination means for determining, before the print operations start, whether the remaining ink amount is sufficient for the printer to complete the print operations based on the print data; and second transmitting means for transmitting required ink amount data indicating the required ink amount and the remaining ink amount data to the terminal, wherein the first transmitting means further transmits the print data to the printer only if the determination means has determined that the remaining ink amount is sufficient.

15. A notifying method of notifying a user of an ink amount, the notifying method comprising the steps of:

(a) converting image data into print data;

(b) predicting a required ink amount indicating an ink amount required by a printer for performing print operations, the print operations being performed for forming a print image on recording medium based on the print data;

(c) detecting a remaining ink amount indicating an ink amount remaining in the printer;

(d) comparing the required ink amount with the remaining ink amount;

(e) determining whether or not the remaining ink amount is sufficient for the printer to complete the print operations based on the print data;

(f) notifying a user of a determining result of the step (e), before the printer starts performing the print operations based on the print data; and (g) performing the printing operations to form the print image based on the print data if it is determined in step (e) that the remaining ink amount is sufficient.

16. The notifying method according to claim 15, further comprising the steps of (g) determining how much ink is short when it is determined in the step (e) that the remaining ink amount is not sufficient, and (h) notifying the user of how much ink is short.

17. The notifying method according to claim 15, wherein the step (d) comprises the steps of (i) generating preview data based on the image data, and (j) predicting the required ink amount based on the preview data.

18. The notifying method according to claim 17, wherein the step (j) comprises the steps of:

(k) displaying a preview image based on the preview data, (l) calculating an average tone of pixels of the preview image, (m) based on the average tone, calculating an average density of the print image printed by the print operations, and (n) calculating, as the required ink amount, an ink amount required for printing an entire print region with the average density at an actual print size.

19. The notifying method according to claim 15, further comprising the steps of (o) determining whether or not ink needs to be replenished; and (p) notifying a user that the ink needs to be replenished when it is determined in the step (o) that ink needs to be replenished.

20. The notifying method according to claim 15, wherein the step (c) comprises the steps of (q) storing initial ink amount data indicating an amount of ink remaining in the printer immediately after ink has replenished last time;

(r) based on a cumulative amount of print data, detecting consumed ink amount indicating an amount of ink consumed since the ink has replenished last time; and (s) subtracting the consumed ink amount from the initial ink amount, thereby obtaining the remaining ink amount.

21. The notifying method according to claim 15, further comprising the steps of:

(t) detecting a condition of the printers; and (u) notifying the user of the condition of the printers.

22. The notifying method according to claim 21, further comprising the steps of (v) based on the remaining ink amount and the condition of the print operations, automatically selecting one of a plurality of printers to which the print data is transmitted.

* * * * *